US012670106B2

(12) United States Patent
Pho et al.

(10) Patent No.: US 12,670,106 B2
(45) Date of Patent: Jun. 30, 2026

(54) SYSTEM AND METHOD OF EXCLUSIVE MEMORY ACCESS AMONG MULTIPLE PROCESSING DEVICES

(71) Applicant: NXP USA, Inc., Austin, TX (US)

(72) Inventors: Quyen Pho, Pflugerville, TX (US);
Ujwala Malwade, Austin, TX (US);
Martin Mienkina, Bystrice Nad Olsi (CZ)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 18/908,345

(22) Filed: Oct. 7, 2024

(65) Prior Publication Data

US 2026/0099448 A1      Apr. 9, 2026

(51) Int. Cl.
*G06F 12/12* (2016.01)
*G06F 12/02* (2006.01)
*G06F 12/126* (2016.01)

(52) U.S. Cl.
CPC ........ *G06F 12/126* (2013.01); *G06F 12/0292* (2013.01)

(58) Field of Classification Search
CPC ........ G06F 12/126; G06F 12/12; G06F 12/02; G06F 12/0292; G06F 11/1068;
(Continued)

(56) References Cited

U.S. PATENT DOCUMENTS 6,917,967 B2    7/2005  Wu et al.
6,957,315 B2 * 10/2005  Chauvel ................ G06F 12/126
                                                        711/E12.075
(Continued)

FOREIGN PATENT DOCUMENTS

DE        102015102135 A      9/2015
EP            3792759 A1      3/2021
(Continued)

OTHER PUBLICATIONS

A. Shriraman, S. Dwarkadas and M. L. Scott, "Flexible Decoupled Transactional Memory Support," 2008 International Symposium on Computer Architecture, Beijing, China, 2008, pp. 139-150.*
(Continued)

*Primary Examiner* — Pierre Michel Bataille

(57) ABSTRACT

A processing system including processing cores, a shared memory, a shift table that stores a maximum number of reservations to locations in the memory, and an exclusive monitor that uses the shift table and an eviction policy to enforce core synchronization. The eviction policy is based on priority, age of valid reservations, shift table fullness state, and reservation memory conflict. The shift table may include a memory address and a size value indicative of a flexible amount of reserved memory at the memory address. The exclusive monitor evicts an oldest reservation in the shift table having a same or lower priority level as the new reservation. The exclusive monitor rejects the new reservation when the shift table is full of higher priority reservations. Reservations are shifted to maintain age status. Stale reservations may be invalidated or have their priority lowered. Conflicting reservations may be made with the same priority level.

21 Claims, 6 Drawing Sheets

| CYCLE NUMBER: | CYC 1 | CYC 2 | CYC 3 | CYC 4 | CYC 5 | CYC 6 | CYC 7 | CYC 8 | CYC 9 |
|---|---|---|---|---|---|---|---|---|---|
| CORE EX. OPS: | EXRD A PX | EXRD B PY | EXRD C PZ | NORMAL ACCESS | EXWR A | EXWR B | EXWR C | ... | ... |
| # VALID ENTRIES IN TABLE: | 0 VALID | 1 VALID | 2 VALID | 3 VALID (MAX) | | 2 VALID | 1 VALID | 0 VALID | ... |
| EX. MONITOR COMM TO CORE: | ... | ... | EXR OK A | EXR OK B | EXR OK C | NORMAL DONE | EXW OK A | EXW OK B | EXW OK C |
| EVICTIONS/ REJECTIONS: | NONE | | | | | | | | |

(58) Field of Classification Search
CPC ............. G06F 11/0787; G06F 13/1673; G06F 12/127; G06F 12/123; G06F 12/121
See application file for complete search history.

(56) References Cited

U.S. PATENT DOCUMENTS

| | | | |
|---|---|---|---|
| 7,013,379 B1 * | 3/2006 | Testardi ................ | G06F 3/0613 711/E12.067 |
| 7,421,529 B2 | 9/2008 | Speier et al. | |
| 8,929,319 B2 * | 1/2015 | Anderson .......... | H04W 74/006 370/329 |
| 9,898,303 B2 | 2/2018 | Henry et al. | |
| 11,868,801 B2 | 1/2024 | Shulman et al. | |
| 12,164,422 B2 * | 12/2024 | Sheridan ............. | G06F 13/1668 |
| 2007/0094430 A1 | 4/2007 | Speier et al. | |
| 2009/0193196 A1 | 7/2009 | Kornegay et al. | |
| 2012/0226871 A1 * | 9/2012 | Cantin ................. | G06F 12/123 711/135 |
| 2013/0311686 A1 * | 11/2013 | Fetterman ............. | H04L 49/254 710/54 |
| 2014/0351524 A1 * | 11/2014 | Natarajan .......... | G06F 12/0891 711/130 |
| 2021/0081251 A1 | 3/2021 | Sanderson et al. | |
| 2021/0200695 A1 * | 7/2021 | Magro ................. | G11C 11/406 |
| 2023/0393987 A1 * | 12/2023 | Zheng .................. | G06F 12/123 |
| 2023/0409485 A1 | 12/2023 | Gholkar et al. | |
| 2024/0419607 A1 * | 12/2024 | Bhoria ................. | G06F 12/128 |
| 2025/0036589 A1 * | 1/2025 | Kloth .................. | G06F 13/1668 |

FOREIGN PATENT DOCUMENTS

| | | | | |
|---|---|---|---|---|
| EP | 4081906 A1 * | 11/2022 | | |
| EP | 3828714 B1 | 4/2024 | | |
| WO | WO-2014062365 A1 * | 4/2014 | ............ | H04L 45/38 |
| WO | WO-2015195351 A1 * | 12/2015 | ......... | G06F 12/0623 |

OTHER PUBLICATIONS

AMBA AXI Protocol Specification. ARM Limited. Issue J, Mar. 2023. pp. 1-273.

Arm v8-M Architecture Reference Manual. ARM Limited. Document No. DDI0553B.y. Document version: ID09082024. Aug. 9, 2024. p. 270.

* cited by examiner

114

STATE (1)

| ENTRY NO. | POSITION | VALID [Y/N] | ADDR. (0x) | ATTR. | INITIATOR ID | PRIORITY | ERG (B) |
|---|---|---|---|---|---|---|---|
| 1 | | N | | | | | |
| 2 | | N | | | | | |
| 3 | | N | | | | | |
| 4 | | N | | | | | |
| 5 | | N | | | | | |
| 6 | (NEWEST) | Y | C000 | AT3 | Z | 0 | 8 |
| 7 | | Y | B000 | AT2 | Y | 1 | 64 |
| 8 | (OLDEST) | Y | A000 | AT1 | X | 0 | 16 |

114

STATE (2)

| ENTRY NO. | POSITION | VALID [Y/N] | ADDR. (0x) | ATTR. | INITIATOR ID | PRIORITY | ERG (B) |
|---|---|---|---|---|---|---|---|
| 1 | | N | | | | | |
| 2 | | N | | | | | |
| 3 | | N | | | | | |
| 4 | | N | | | | | |
| 5 | (NEWEST) | Y | D000 | AT4 | V | 1 | 64 |
| 6 | | Y | C000 | AT3 | Z | 0 | 8 |
| 7 | | Y | B000 | AT2 | Y | 1 | 64 |
| 8 | (OLDEST) | Y | A000 | AT1 | X | 0 | 16 |

114

STATE (3)

| ENTRY NO. | POSITION | VALID [Y/N] | ADDR. (0x) | ATTR. | INITIATOR ID | PRIORITY | ERG (B) |
|---|---|---|---|---|---|---|---|
| 1 | | N | | | | | |
| 2 | | N | | | | | |
| 3 | | N | | | | | |
| 4 | | N | | | | | |
| 5 | (NEWEST) | Y | D000 | AT4 | V | 1 | 64 |
| 6 | | Y | C000 | AT3 | Z | 0 | 8 |
| 7 | | N | B000 | AT2 | Y | 1 | 64 |
| 8 | (OLDEST) | Y | A000 | AT1 | X | 0 | 16 |

Invalidated

114

STATE (4)

| ENTRY NO. | POSITION | VALID [Y/N] | ADDR. (0x) | ATTR. | INITIATOR ID | PRIORITY | ERG (B) |
|---|---|---|---|---|---|---|---|
| 1 | | N | | | | | |
| 2 | | N | | | | | |
| 3 | | N | | | | | |
| 4 | | N | | | | | |
| 5 | | N | | | | | |
| 6 | (NEWEST) | Y | D000 | AT4 | V | 1 | 64 |
| 7 | | Y | C000 | AT3 | Z | 0 | 8 |
| 8 | (OLDEST) | Y | A000 | AT1 | X | 0 | 16 |

Shifted

Shifted

*FIG. 3*

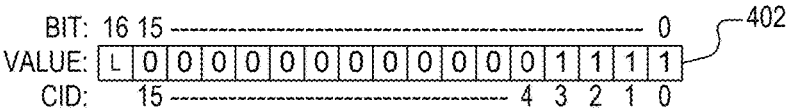
*FIG. 4*
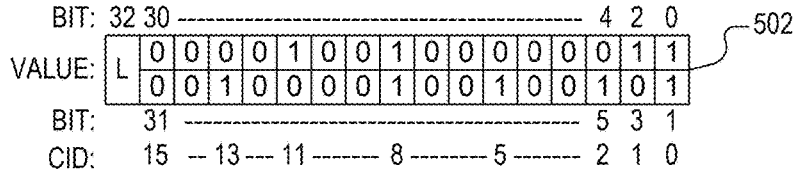
*FIG. 5*
0x1000 – 0x103F:    602
LE/SE 0x1000:    604
LEB/SEB 0x1004:    606
LEW/SEW 0x1008:    608
LEDW/SEDW 0x1010:    610
LEQW/SEQW 0x1020:    612
LEDW/SEDW 0x1026:    614
*FIG. 6*

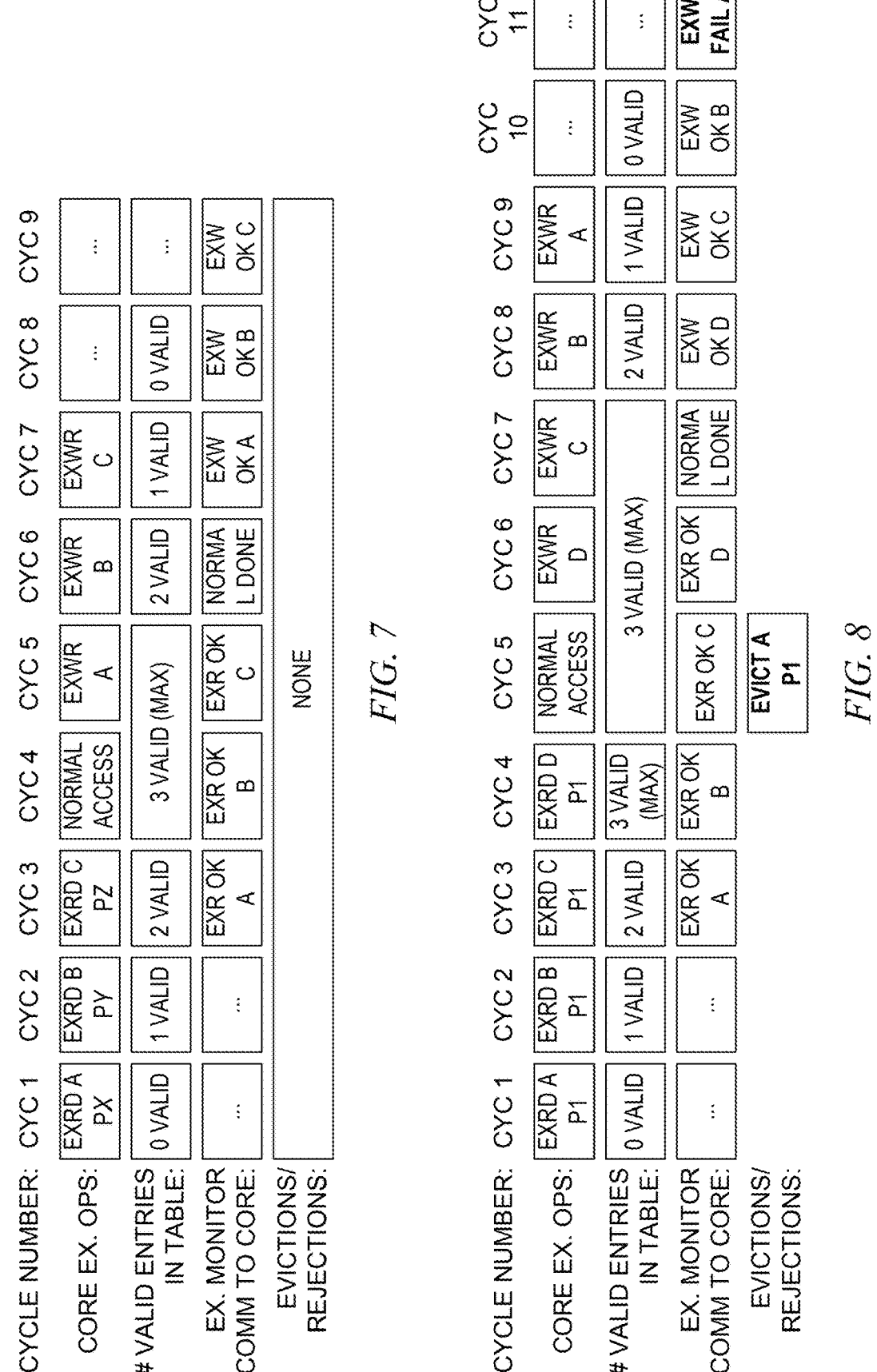

| CYCLE NUMBER: | CYC 1 | CYC 2 | CYC 3 | CYC 4 | CYC 5 | CYC 6 | CYC 7 | CYC 8 | CYC 9 |
|---|---|---|---|---|---|---|---|---|---|
| CORE EX. OPS: | EXRD A PX | EXRD B PY | EXRD C PZ | NORMAL ACCESS | EXWR A | EXWR B | EXWR C | ... | ... |
| # VALID ENTRIES IN TABLE: | 0 VALID | 1 VALID | 2 VALID | 3 VALID (MAX) | | 2 VALID | 1 VALID | 0 VALID | |
| EX. MONITOR COMM TO CORE: | ... | | EXR OK A | EXR OK B | EXR OK C | NORMAL DONE | EXW OK A | EXW OK B | EXW OK C |
| EVICTIONS/ REJECTIONS: | | | | | NONE | | | | |

*FIG. 7*

| CYCLE NUMBER: | CYC 1 | CYC 2 | CYC 3 | CYC 4 | CYC 5 | CYC 6 | CYC 7 | CYC 8 | CYC 9 | CYC 10 | CYC 11 |
|---|---|---|---|---|---|---|---|---|---|---|---|
| CORE EX. OPS: | EXRD A P1 | EXRD B P1 | EXRD C P1 | EXRD D P1 | NORMAL ACCESS | EXWR D | EXWR C | EXWR B | EXWR A | ... | ... |
| # VALID ENTRIES IN TABLE: | 0 VALID | 1 VALID | 2 VALID | 3 VALID (MAX) | 3 VALID (MAX) | | | 2 VALID | 1 VALID | 0 VALID | |
| EX. MONITOR COMM TO CORE: | ... | | EXR OK A | EXR OK B | EXR OK C | EXR OK D | NORMAL DONE | EXW OK D | EXW OK C | EXW OK B | EXW FAIL A |
| EVICTIONS/ REJECTIONS: | | | | | EVICT A P1 | | | | | | |

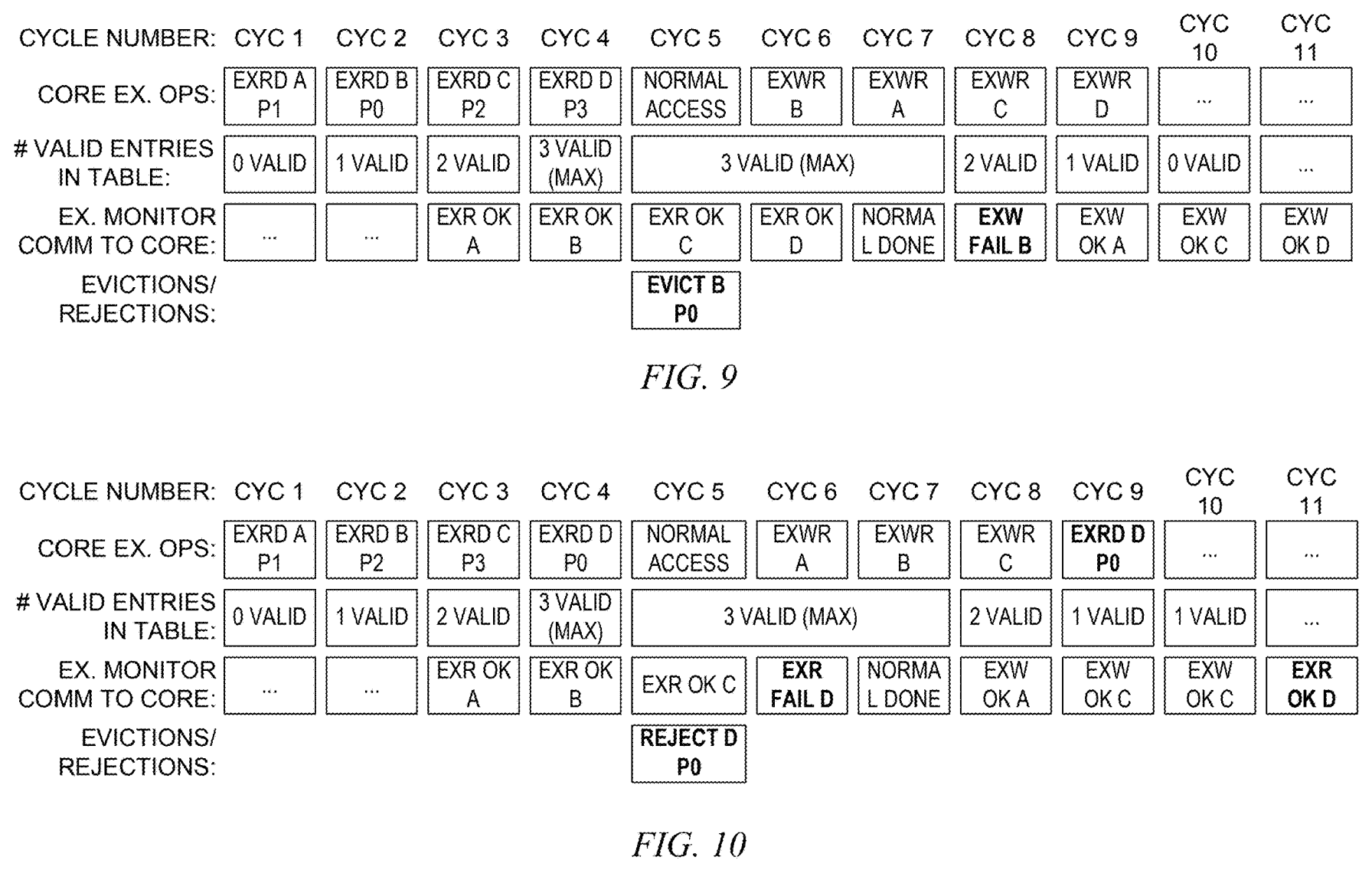

| CYCLE NUMBER: | CYC 1 | CYC 2 | CYC 3 | CYC 4 | CYC 5 | CYC 6 | CYC 7 | CYC 8 | CYC 9 | CYC 10 | CYC 11 |
|---|---|---|---|---|---|---|---|---|---|---|---|
| CORE EX. OPS: | EXRD A P1 | EXRD B P0 | EXRD C P2 | EXRD D P3 | NORMAL ACCESS | EXWR B | EXWR A | EXWR C | EXWR D | ... | ... |
| # VALID ENTRIES IN TABLE: | 0 VALID | 1 VALID | 2 VALID | 3 VALID (MAX) | 3 VALID (MAX) | | | 2 VALID | 1 VALID | 0 VALID | |
| EX. MONITOR COMM TO CORE: | ... | | EXR OK A | EXR OK B | EXR OK C | EXR OK D | NORMAL DONE | EXW FAIL B | EXW OK A | EXW OK C | EXW OK D |
| EVICTIONS/ REJECTIONS: | | | | | EVICT B P0 | | | | | | |

FIG. 10

| CYCLE NUMBER: | CYC 1 | CYC 2 | CYC 3 | CYC 4 | CYC 5 | CYC 6 | CYC 7 | CYC 8 | CYC 9 | CYC 10 | CYC 11 |
|---|---|---|---|---|---|---|---|---|---|---|---|
| CORE EX. OPS: | EXRD A P1 | EXRD B P2 | EXRD C P3 | EXRD D P0 | NORMAL ACCESS | EXWR A | EXWR B | EXWR C | EXRD D P0 | ... | ... |
| # VALID ENTRIES IN TABLE: | 0 VALID | 1 VALID | 2 VALID | 3 VALID (MAX) | 3 VALID (MAX) | | | 2 VALID | 1 VALID | 1 VALID | |
| EX. MONITOR COMM TO CORE: | ... | | EXR OK A | EXR OK B | EXR OK C | EXR FAIL D | NORMAL DONE | EXW OK A | EXW OK C | EXW OK C | EXR OK D |
| EVICTIONS/ REJECTIONS: | | | | | REJECT D P0 | | | | | | |

SYSTEM AND METHOD OF EXCLUSIVE MEMORY ACCESS AMONG MULTIPLE PROCESSING DEVICES

BACKGROUND

Field

The present disclosure relates in general to processing systems with multiple processing devices and a shared memory, and more particularly to a system and method of exclusive access of the shared memory.

Description of Related Art

Due to increased demand on performance of real-time control units, multicore microcontrollers or microprocessors or the like are increasingly developed to address performance needs. Along with embedding multiple processing cores (or simply "cores"), a need arises for exchanging data between the cores of a multicore system. A typical media for exchanging data among cores in multicore system is a shared memory with read/write access attributes granted to each core participating in data exchange. A system designer must ensure that at a given point of time one core does not overwrite the memory written by another core. The architecture, therefore, must implement some sort of semaphore type of operation. A simple semaphore type of operation is enabled by an exclusive access method. Exclusive access is a sequence of a read transaction followed by write transaction to the same address. A successful exclusive access or reservation by the initiating core yields a success response while attempted accesses by other cores yield fail responses. The advantage of exclusive access is that semaphore type operations do not impact either the critical bus access latency or the maximum achievable bandwidth.

BRIEF DESCRIPTION OF THE DRAWINGS

Embodiments of the present invention are illustrated by way of example and are not limited by the accompanying figures. Similar references in the figures may indicate similar elements. Elements in the figures are illustrated for simplicity and clarity and have not necessarily been drawn to scale.

FIG. 3 is a series of states of the shift table of FIG. 1 illustrating operation of the exclusive monitor controlling and using the shift table for reserving memory locations according to one embodiment.

FIG. 4 is a simplified block diagram of a priority assignment register for assigning 2-level priority to each of up to 16 CIDs according to one embodiment.

FIG. 5 is a simplified block diagram of a priority assignment register for assigning 4-level priority to each of up to 16 CIDs according to one embodiment.

FIG. 6 is a simplified series of depictions of an exemplary memory location illustrating flexible exclusive reservation granule (ERG) implemented according to one embodiment.

FIGS. 7, 8, 9, and 10 are timing diagrams illustrating operation of the exclusive monitor of FIG. 1 using a reduced version of the shift table for making and completing reservations in the memory according to one embodiment.

DETAILED DESCRIPTION

A processing system as described herein includes multiple processing cores, a shared memory, a shift table, and an exclusive monitor. The shift table is configured to store up to a predetermined maximum number of reservations to addressed locations in the shared memory, in which each reservation includes an entry number indicative of an age of the reservation, a validity value, a memory address, an initiator identifier, a priority value indicative of one of multiple priority levels, and a size value indicative of a flexible amount of reserved memory at the memory address. The exclusive monitor is configured to use the shift table to enforce synchronization between the processing cores sharing the memory, in which the exclusive monitor uses an eviction policy based on priority level, age, a fullness state of the shift table, and reservation memory conflict when a new reservation is received.

The exclusive monitor is configured to evict the oldest reservation in the shift table having a same or lower priority level as a priority level of the new reservation. The exclusive monitor is configured to reject the new reservation when the new reservation has a lower priority level than each valid reservation in the shift table when the shift table is full. The priority levels include at least two priority levels or at least four priority levels. The size value is flexible to include different sizes up to a predetermined maximum memory size. The size value may be a number of bytes up to a predetermined maximum number of bytes. For example, the size value may be a single byte up to a maximum number of bytes, such as 64 bytes. The exclusive monitor may be configured to shift reservations in the shift table that are newer than an invalidated reservation by one entry to replace the invalidated reservation. The exclusive monitor may be configured to detect and invalidate a stale reservation in the shift table, or to detect and change a priority of the stale reservation to a lowest priority level. The exclusive monitor may be configured to enter multiple reservations at conflicting memory addresses in the shift table when at the same priority level, and to evict any lower priority reservations in the shift table that have a memory conflict with the new reservation having a higher priority level.

Figure 1:
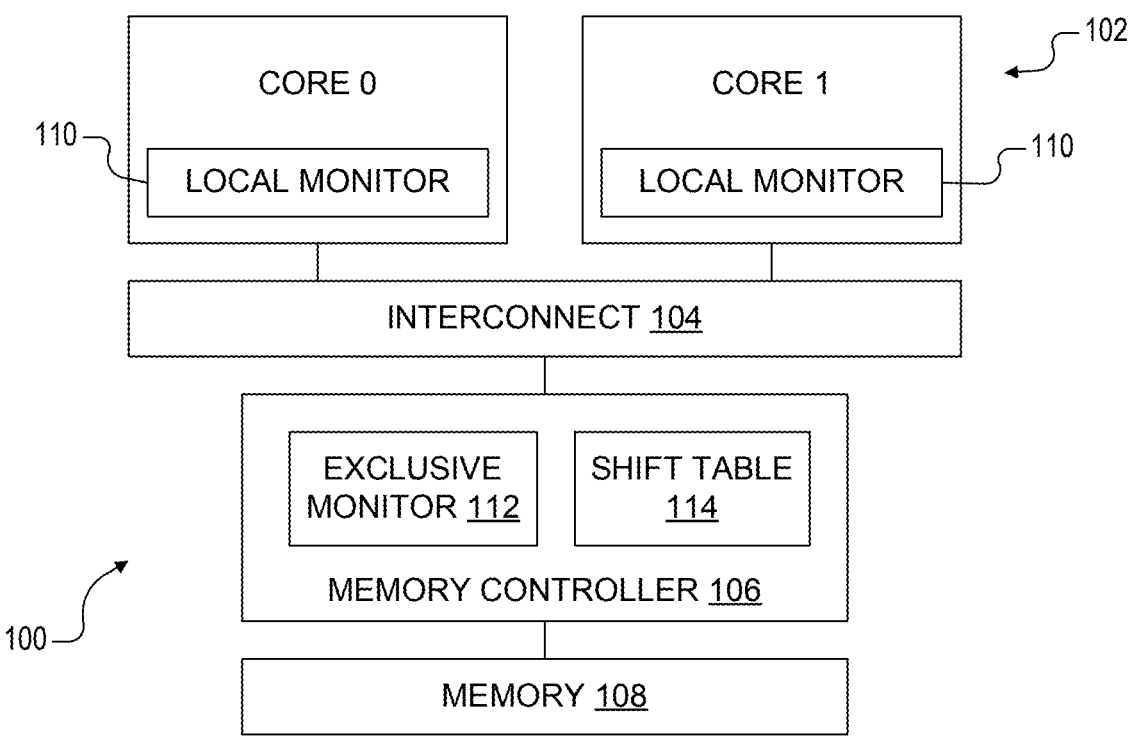
FIG. 1 is a simplified block diagram of a multicore processing system implemented according to one embodiment.

FIG. 1 is a simplified block diagram of a multicore processing system 100 implemented according to one embodiment. The multicore processing system 100 includes multiple processing cores or simply "cores" 102 coupled to an interconnect 104, which is further coupled to a memory 108 via a memory controller 106. The cores 102 include a first core CORE 0 and a second core CORE 1, although it is understood that additional processing cores may be included. Each of the cores 102 includes a local monitor 110 that is used to enforce synchronization between applications running on that same core and is not further described. The interconnect 104 may be implemented in any suitable manner, such as a bus, an interconnected system of buses, or a switching network or the like. The memory 108 may be implemented in any suitable manner, such as any type of volatile or non-volatile random-access memory (RAM) including a fast volatile data storage such as, for example, a static RAM (SRAM).

The memory controller 106 is shown including an exclusive monitor 112 that is configured to enforce synchronization between applications running on the different cores 102 within the multicore processing system 100 for accessing the memory 108. The exclusive monitor 112 includes or otherwise uses a shift table 114 for tracking memory reservations as further described herein. The shift table 114 may be provided within or otherwise accessible by the memory controller 106. It is noted that the shift table 114 has a limited size, meaning that it is configured to hold up to a predetermined maximum number of memory reservations to save memory space. Because the shift table 114 holds a limited number of reservations, an eviction policy is implemented and enforced for handling new reservations when the shift table 114 is full. The eviction policy determines whether the new reservation is rejected or whether the new reservation replaces an existing reservation that is consequently rejected.

The multicore processing system 100 may be implemented as any type of multicore architecture such as a multicore microcontroller or a central processing unit (CPU) or the like. Such configurations may be implemented on a system-on-chip (SoC) architecture. The multicore processing system 100 may be implemented as an ARM processor operating according to the Advanced eXtensible Interface (AXI) protocol, and further according to the Advanced Microcontroller Bus Architecture (AMBA) or the Advanced High-Performance Bus (AHB) or the like. Although the multicore processing system 100 may be configured to operate in the context of ARM, AXI, AMBA or AHB, the present disclosure is not limited thereto such that alternative processors, architectures, and protocols are contemplated.

Figure 2:
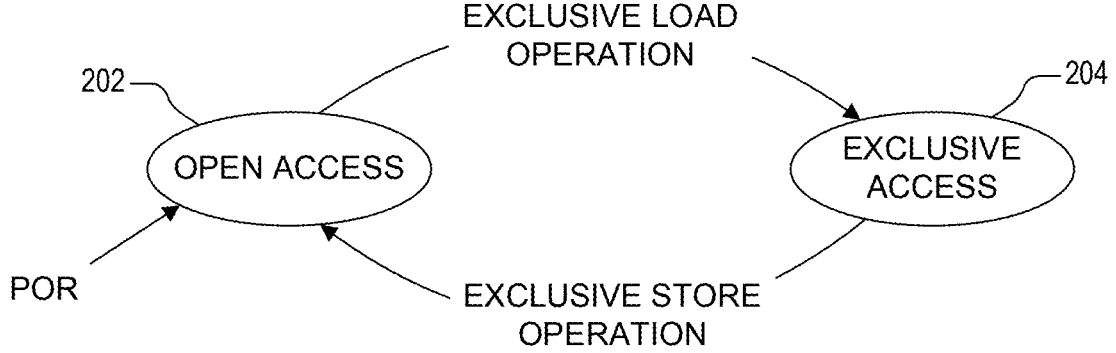
FIG. 2 is a simplified state machine diagram illustrating the state of each memory location within the memory of FIG. 1 as tracked by the exclusive monitor using the shift table according to one embodiment.

FIG. 2 is a simplified state machine diagram illustrating the state of each memory location within the memory 108 as tracked by the exclusive monitor 112 using the shift table 114 according to one embodiment. After power-on, reset (or restart) (POR), the state of each shared memory location enters an open access state 202. A core 102 executes an exclusive load operation (or exclusive read operation) to a memory location, which causes the exclusive monitor 112 to shift that memory location to an exclusive access state 204. This causes the identified memory location to be reserved for the identified core 102, such as, for example, CORE 1 reserving a memory location at address location 0x1000 (using hexadecimal notation with prefix "0x"). Valid reservations are stored in the shift table 114 as further described herein. Subsequently, CORE 1 executes an exclusive store operation (or exclusive write operation) to the reserved memory location 0x1000, which causes the exclusive monitor 112 to switch that memory location back to the access state 202, thus clearing the reservation. Cleared reservations are removed from the shift table 114 (or otherwise invalidated) as further described herein.

FIG. 3 is a series of states of the shift table 114 illustrating operation of the exclusive monitor 112 controlling and using the shift table 114 for reserving memory locations according to one embodiment. The illustrated shift table 114 includes up to a maximum of 8 entries numbered under a first column labeled "ENTRY NO." A second column is labeled "POSITION" distinguishing between the oldest entry at bottom (first in), the newest entry at top, and any other entries in between. The third column is labeled "VALID" which is either "Y" for valid or "N" for invalid or not valid. The fourth column is labeled ADDR which identifies the memory location in hexadecimal format (e.g., including "0x" prefix). The fifth column is labeled "ATTR" and identifies corresponding attributes of the memory access, such as whether cacheable, any protection, any permissions, burst length, etc. The sixth column is labeled "INITIATOR ID" which identifies the initiating entity making the reservation. In one embodiment, the initiator ID may be a core identifier (CID) that identifies the core making the reservation. The seventh column is labeled "PRIORITY" which identifies the relative priority of the core making the reservation. The eighth column is labeled "ERG" denoting an exclusive reservation granule (ERG) which generally denotes the size of the memory location being reserved in bytes (B). In one embodiment, the memory size may be as small as 1 byte and as large as 64 bytes (e.g., byte sizes of 1, 2, 4, 8, 16, 32, 64). Alternative sizes are of course contemplated.

It is noted that the resources of the multicore processing system 100 may be subdivided into separate domains each identified by corresponding domain identifier (DID). Each domain may include one or more cores 102 along with other system resources or peripherals. In various embodiments, a processing core may be shared by multiple domains, so that the same core may make different reservations under different DIDs in separate accesses. In the illustrated embodiments, the initiator ID of each reservation is the core identified by a corresponding CID. In alternative embodiments, the initiator ID may be the DID, both the CID and the DID, or any other suitable identifier.

A first state (1) of the shift table 114 includes 3 valid entries at entry numbers 6, 7, and 8. The oldest entry is pushed to the bottom at entry number 8, which holds a reservation of 16 bytes for CID X at address 0xA000 with attributes listed as AT1 and with a priority of 0. The attributes are simplified to an alphanumeric representation of set of attributes, such as AT1, AT2, AT3, etc. In this case, there are only two priority levels including "0" for low priority and "1" for high priority. More priority levels may be defined as further described herein. The next oldest entry is at entry number 7 which holds a reservation of 64 bytes for CID Y at address 0xB000 with attributes listed as AT2 and with a priority of 1. The newest entry in the first state (1) is at entry number 6 which holds a reservation of 8 bytes for CID Z at address 0xC000 with attributes listed as AT3 and with a priority of 0. Thus, entry number 6 is the newest entry at the top of the valid entries, whereas entry number 8 is the oldest entry at the bottom of the valid entries (and typically at the bottom of the shift table 114). The entries 1-4 of the shift table 114 are empty or otherwise invalid, so that the shift table 114 is not full.

The next state (2) of the shift table 114 illustrates the addition of a new reservation, which is entered at entry number 5. In this manner, each new entry is entered by the exclusive monitor 112 at the next available or invalid entry (if any) above the valid entries. The newest entry thus inserted at the next available entry number 5 forming a new reservation of 64 bytes for CID V at address 0xD000 with attributes listed as AT4 and with a priority of 1. The older reservations at entry numbers 6-8 are still included and valid.

The next state (3) of the shift table 114 illustrates the exclusive monitor 112 invalidating an existing valid entry. A valid entry may be invalidated, for example, when the entity that made the reservation performed an exclusive store operation to the same memory location, thereby clearing that reservation. In this case, entry number 7 for CID Y at memory location 0xB000 is invalidated as indicated by an "N" in the VALID column. The remaining entries at entry numbers 5, 6, and 8 remain valid.

The next state (4) of the shift table 114 illustrates the exclusive monitor 112 removing the invalidated entry previously located at entry 7 and the repositioning or shifting of remaining valid entries according to one embodiment. In this case, after the removal of the invalidated reservation for CID Y at memory location 0xB000, the reservation for DID Z at memory location 0xC000, which was previously at entry number 6, is shifted down to position 7. In addition, the reservation for DID V at memory location 0xD000, which was previously at entry number 5, is shifted down to position 6 and remains the newest entry.

In summary as illustrated by the states (1), (2), (3), and (4) of the shift table 114, each new entry is inserted at the next available invalid entry position, if any, above the last valid entry (or at the bottom of the shift table 114). Also, in the event of an invalidated reservation other than the newest entry, remaining valid entries above the invalidated entry are shifted down to higher entry numbers to fill in the invalidated entry. The result enables an age determination in which the oldest reservation is positioned at the bottom of the shift table 114 and the newest entry remains at the top entry number of the list of valid entries.

The exclusive monitor 112 is configured to use the shift table 114 to enforce synchronization between the cores 102 sharing the memory 108 by operating according to an eviction policy based on priority level, an age of valid reservations, a fullness state of the shift table 114, and any reservation memory conflict when a new reservation is received as further described herein. The eviction policy dictates whether a new reservation is rejected or whether an existing reservation is evicted in favor of the new reservation. Although not shown in FIG. 3, eventually the shift table 114 may become full in which each of the entries 1-8 include a valid reservation when a new reservation is received. Since the shift table 114 holds up a predetermined maximum number of valid entries (e.g., 8), it has a fullness state of "full" when holding the predetermined maximum number of valid entries, but otherwise has a fullness state of "not full." As described further herein, the oldest reservation or the reservation entry with the lowest priority is targeted for invalidation and eviction in favor of the new reservation. If the newly received reservation has a lower priority level than all of the current reservations, then the new reservation is rejected. An entity or core that attempts a reservation that is rejected may attempt to make the same reservation at a later time. A reservation memory conflict generally means that two or more reservations are attempting to reserve the same memory location or at least one common memory location. The exclusive monitor 112 uses relative priority to resolve reservation memory conflicts as further described herein.

FIG. 4 is a simplified block diagram of a priority assignment register 402 for assigning 2-level priority to each of up to 16 CIDs according to one embodiment. The illustrated priority assignment register 402 includes 17 bits in which the first 16 bits numbered 0 to 15 are for assigning priority to corresponding CIDs and the last or remaining bit (e.g., bit 16) is a lock bit. The priority assignment bits are cleared to logic "0" for assigning low priority and set to logic "1" for assigning high priority to the corresponding CID, identified with numeric values. As shown, for example, CIDs 0-3 are assigned high priority and the remaining CIDs 4-15 are assigned low priority. The lock bit is cleared to allow priority programming access, and then is set to lock the programmed priority assignments. The priority assignment register 402 is exemplary only in which many different register formats may be used.

FIG. 5 is a simplified block diagram of a priority assignment register 502 for assigning 4-level priority to each of up to 16 CIDs according to one embodiment. The illustrated priority assignment register 502 includes 33 bits in which the first 32 bits numbered 0 to 31 are used in pairs for assigning priority to corresponding CIDs (again identified with numeric values), and the last or remaining bit (e.g., bit 32) is a lock bit. In this case, each CID is assigned 2 priority bits in which any one of 4 priority levels may be assigned from lowest to highest as "00" "01" "10" "11". As shown, for example, CIDs 0 and 8 are assigned highest priority level "11", CIDs 1 and 11 are assigned next highest priority level "10", CIDs 5 and 13 are assigned priority level "01", and the remaining CIDs 3-4, 6-7, 9-10, 12, and 14-15 are assigned the lowest priority level "00". Again, the lock bit is cleared to allow priority programming access and is set to lock the programmed priority assignments. The priority assignment register 502 is exemplary only in which many different register formats may be used.

Each of the cores of the multicore processing system 100, as represented by corresponding CIDs, may thus be assigned a relative priority level. The assignment of priority allows a user to distinguish between critical or high-priority applications or operations and normal or low-priority applications or operations executing on the multicore system 100. To support freedom from interference, for example, it is important that critical applications, for example safety relevant or real-time control applications, are allowed to complete exclusive access without a need for retries. The assignment of priority also allows the system hardware or software to establish an eviction or rejection protocol for the shift table 114 as further described herein.

FIG. 6 is a simplified series of depictions of an exemplary memory location illustrating flexible ERG implemented according to one embodiment. The illustrated memory location starts at address 0x1000 and includes 64 bytes (64 B) up to address 0x03F in which each byte is 8 bits and represented as a square (e.g., shown as a sequential set of 64 squares). The first depiction 602 of the memory location at address 0x1000 (and up to 0x103F) is in the open access state before any reservations are made. Each memory square depicting an 8-bit byte is non-shaded indicating the open access state. An exclusive load/store pair of instructions load-exclusive (LE) and store-exclusive (SE) at address 0x1000 may be made for making a reservation for the entire set of 64 bytes as shown at depiction 604. In this case, each memory square is shaded indicating the exclusive access state for the entire 64 B row of memory locations.

A related pair of instructions LEB/SEB may be used to reserve a single byte within a 64 B row. As shown at depiction 606, for example, an exclusive load/store pair of instructions LEB/SEB at address 0x1004 may be made for making a reservation for only one byte at address 0x1004 (in which only a single byte of the 64 B row is shown shaded). A related pair of instructions LEW/SEW may be used to reserve a word including two bytes within a 64 B row. As shown at depiction 608, for example, an exclusive load/store pair of instructions LEW/SEW at address 0x1008 may be made for making a reservation for one word (two bytes) at address 0x1008 (in which only a pair of bytes of the 64 B row are shown shaded). A related pair of instructions LEDW/SEDW may be used to reserve a doubleword including four bytes within a 64 B row. As shown at depiction 610, for example, an exclusive load/store pair of instructions LEDW/SEDW at address 0x1010 may be made for making a reservation for one doubleword (four bytes) at address 0x1010 (in which only four consecutive bytes of the 64 B row are shown shaded). A related pair of instructions LEQW/SEQW may be used to reserve a quadword including eight bytes within a 64 B row. As shown at depiction 612, for example, an exclusive load/store pair of instructions LEQW/SEQW at address 0x1020 may be made for making a reservation for one quadword (eight bytes) at address 0x1020 (in which only eight consecutive bytes of the 64 B row are shown shaded). Similar exclusive instruction pairs may be defined for making reservations of different numbers of bytes. In general, a related set of exclusive instruction pairs may be used for reserving 1, 2, 4, 8, 16, 32, or 64 bytes at a specified address of the memory 108.

Conventional configurations were fixed at 64 B or some other fixed memory size so that it was required to reserve the entire row of bytes at a given address. Flexible ERB allows a greater level of granularity for making such reservations. In this manner, multiple reservations may be made within a given row of 64 B at different addresses so long as there are no memory conflicts or overlaps. For example, each of the instruction sets, including LEB/SEB at address 0x1004, LEW/SEW at address 0x1008, LEDW/SEDW at address 0x1010, and LEQW/SEQW at address 0x1020 may all be made simultaneously without conflict. However, the LE/SE pair reserving the entire row cannot be made simultaneously with any other reservation in the same memory row, and multiple reservations may not be simultaneously made to the same memory address.

In addition, a conflict arises even at different addresses when there is an overlap of at least one byte. As shown at depiction 614, for example, an exclusive load/store pair of instructions LEDW/SEDW at address 0x1026 may be made for making a reservation for one doubleword (four bytes) at address 0x1026 (in which only four consecutive bytes of the 64 B row are shown shaded). Yet these instructions at address 0x1026 conflict with the exclusive load/store pair of instructions LEQW/SEQW at address 0x1020 since there are 2 overlapping bytes at addresses 0x1026 and 0x1027.

FIGS. 7, 8, 9, and 10 are timing diagrams illustrating operation of the exclusive monitor 112 using a reduced version of the shift table 114 for making and completing reservations in the memory 108 according to one embodiment. In these particular examples, the memory locations of the different reservations are assumed to not overlap so that there are no memory conflicts. The reduced version of the shift table 114 is substantially the same but has only 3 entries rather than 8 for purposes of simplified illustration. The top row lists the cycle (CYC) number starting with CYC 1 and incrementing for subsequent sequential cycles. The second row identifies processing core exclusive operations (CORE EX. OPS) for making and completing reservations, in which each core is identified by its corresponding CID. The third row identifies the number of valid entries in the reduced version of the shift table 114 (#VALID ENTRIES IN TABLE), which has a maximum of 3 valid entries. The fourth row identifies communications from the exclusive monitor 112 back to the identified processing core (EX. MONITOR COMM TO CORE) regarding the status of the reservation. The fifth row identifies any reservation evictions or rejections (EVICTIONS/REJECTIONS) made according to the applicable eviction policy as further described herein.

Referring to FIG. 7, a processing core with CID=A performs an exclusive read operation (EXRD A) to the memory 108 at a specified memory location (not specified) during cycle 1. The processing core A has an unspecified priority shown as PX. In a similar manner, another processing core with CID'B with unspecified priority shown as PY performs an exclusive read operation (EXRD B) to the memory 108 at another specified memory location (not specified) during cycle 2, and another processing core with CID=C with unspecified priority shown as PZ performs an exclusive read operation (EXRD C) to the memory 108 at yet another specified memory location (not specified) during cycle 3. Although the memory locations are not specified, the exclusive operations are assumed to not conflict with each other from a memory standpoint. In this example, the priorities may be the same or different yet are unspecified since priority does not matter when the shift table has available entries for receiving reservations. In this case, the shift table has 0 valid entries in cycle 1 so that the exclusive monitor 112 makes the reservation in response to processing core A so that the shift table has 1 valid entry in the next cycle 2. The exclusive monitor 112 responds back to the processing core A in cycle 3 with "EXR OK A" indicating to the processing core A that the exclusive read operation for making the reservation was successful.

Similarly, the exclusive monitor 112 makes the reservation in response to processing core B so that the shift table has 2 valid entries in the next cycle 3, and responds back to the processing core B in cycle 4 with "EXR OK B" indicating to the processing core B that the exclusive read operation for making the reservation was successful. Likewise, the exclusive monitor 112 makes the reservation in response to processing core C so that the shift table has 3 valid entries in the next cycle 4, and responds back to the processing core C in cycle 5 with "EXR OK C" indicating to the processing core C that the exclusive read operation for making the reservation was successful. In cycles 4 and 5, the shift table is full with a maximum number of 3 valid entries.

In cycle 4, a "NORMAL ACCESS" operation is performed meaning a non-exclusive access to a non-shared memory or non-shared portion of the memory 108. This illustrates that the exclusive monitor 112 manages the coherency of shared memories or shared memory portions using exclusive operations without stalling accesses that are targeting non-shared memories. In this manner, normal accesses (other than exclusive accesses) are not affected by the exclusive monitor 112.

In cycle 5, the processing core A executes an exclusive write operation (EXWR A) to the same specified memory location as the EXRD A operation of the processing core A to effectively clear its reservation. In cycle 6, the exclusive monitor 112 clears the reservation in the shift table so that there are now only 2 valid entries. Also, the normal operation completes in cycle 6. The exclusive monitor 112 communicates a message "EXW OK A" in cycle 7 to inform the processing core A that the exclusive write operation clearing its reservation was accepted. Meanwhile, the processing core B executes an exclusive write operation (EXWR B) to the same specified memory location as the previous EXRD A operation of the processing core B to effectively clear its reservation in cycle 6. In cycle 7, the exclusive monitor 112 clears the reservation in the shift table so that there is now only 1 valid entry, and the exclusive monitor 112 communicates the message "EXW OK B" in cycle 8 to inform the processing core B that the exclusive write operation clearing its reservation was accepted. Meanwhile, the processing core C executes an exclusive write operation to the same specified memory location as the previous EXRD C operation of the processing core C to effectively clear its reservation in cycle 7. In cycle 8, the exclusive monitor 112 clears the reservation in the shift table so that there are no more valid entries, and the exclusive monitor 112 communicates the message "EXW OK C" in cycle 9 to inform the processing core C that the exclusive write operation clearing its reservation was accepted.

FIG. 7 illustrates normal operation in which reservations are made and completed without any evictions or rejections since the shift table 114 is able to handle all of the nonconflicting reservations.

Referring to FIG. 8, a processing core A performs an exclusive read operation to the memory 108 at a specified memory location during cycle 1, in which the processing core A (CID=A) has a priority P1. In a similar manner, the processing core B with the same priority P1 performs an exclusive read operation to the memory 108 at another specified memory location during cycle 2, and the processing core C with the same priority P1 performs an exclusive read operation to the memory 108 at another specified memory location during cycle 3. The exclusive read operations of the processing cores A, B, and C are acknowledged by the exclusive monitor 112 in cycles 3, 4, and 5, respectively. In this case, the reduced shift table 114 is full since it holds the maximum of 3 entries as indicated beginning in cycle 4. As with FIG. 7, although the memory locations are not specified, the exclusive operations are assumed to not conflict with each other from a memory standpoint.

Meanwhile in cycle 4, a processing core D with the same priority P1 performs an exclusive read operation to a nonconflicting address while the reduced shift table 114 is full. Since each of the entries in the shift table have the same priority as the new attempted reservation by processing core D, the oldest reservation entry belonging to the processing core A is evicted as indicated in cycle 5 (EVICT A P1) to make room in the shift table for the new reservation. This is true even though the exclusive read operation of the processing core A was already acknowledged as successful. The exclusive read operation of the processing core D is acknowledged by the exclusive monitor 112 in cycle 6. A normal operation begins in cycle 5 and completes in cycle 7.

The processing core D performs an exclusive write operation in cycle 6 which is acknowledged by the exclusive monitor 112 in cycle 8 so that only 2 valid reservations remain in the shift table as indicated in cycle 8. The processing core C performs an exclusive write operation in cycle 7 which is acknowledged by the exclusive monitor 112 in cycle 9 so that only 1 valid reservation remains in the shift table as indicated in cycle 9. The processing core B performs an exclusive write operation in cycle 8 which is acknowledged by the exclusive monitor 112 in cycle 10 so that there are no valid reservations in the shift table as indicated in cycle 10. The processing core A performs an exclusive write operation in cycle 9, but this operation fails as communicated as "EXW FAIL A" by the exclusive monitor 112 in cycle 11, which is the first indication to the core A that the reservation had been evicted. The core A can subsequently perform a new exclusive read operation to make a reservation if needed.

FIG. 8 illustrates an eviction when the oldest reservation with the same priority is evicted in favor of a new reservation.

Referring to FIG. 9, a processing core A performs an exclusive read operation to the memory 108 at a specified memory location during cycle 1, in which the processing core A has a priority P1. The processing core B with a lower priority P0 performs an exclusive read operation to the memory 108 at another specified memory location during cycle 2, and the processing core C with a higher priority P2 performs an exclusive read operation to the memory 108 at another specified memory location during cycle 3. The exclusive read operations of the processing cores A, B, and C are acknowledged by the exclusive monitor 112 in cycles 3, 4, and 5, respectively. Again, the reduced shift table 114 is now full since it holds the maximum of 3 entries as indicated beginning in cycle 4. As with FIGS. 7 and 8, although the memory locations are not specified, the exclusive operations are assumed to not conflict with each other from a memory standpoint.

Meanwhile in cycle 4, a processing core D having an even higher priority P3 performs an exclusive read operation while the shift table is full. As compared to the case shown in FIG. 7, the reservation operation by the processing core A is the oldest entry having the priority level P1 which is lower than the priority of the new reservation by the processing core D. Nonetheless, the reservation operation by the processing core B, even though newer than that of the processing core A, has an even lower priority level P0. In this case, the oldest reservation entry having the lowest priority level belonging to the processing core B is evicted as indicated in cycle 5 to make room in the shift table for the new reservation with higher priority. This is true even though the exclusive read operation of the processing core B was already acknowledged as successful. The exclusive read operation of the processing core D is acknowledged by the exclusive monitor 112 in cycle 6, so that the shift table remains full. A normal operation begins in cycle 5 and completes in cycle 7.

The processing core B performs an exclusive write operation in cycle 6, but this operation fails as communicated by the exclusive monitor 112 as "EXW FAIL B" in cycle 8, which is the first indication to the processing core B that the reservation had been evicted. The processing core B can subsequently perform a new exclusive read operation to make a reservation if needed. The processing core A performs an exclusive write operation in cycle 7 which is acknowledged by the exclusive monitor 112 in cycle 9, so that only 2 valid reservations remain in the shift table as indicated in cycle 8. The processing core C performs an exclusive write operation in cycle 8 which is acknowledged by the exclusive monitor 112 in cycle 10 so that only 1 valid reservation remains in the shift table as indicated in cycle 9. The processing core D performs an exclusive write operation in cycle 9 which is acknowledged by the exclusive monitor 112 in cycle 10 so that there are no valid reservations in the shift table as indicated in cycle 10.

FIG. 9 illustrates an eviction of the first lowest priority entry from the bottom or oldest entries in the shift table in favor of a new higher priority reservation.

Referring to FIG. 10, the processing core A performs an exclusive read operation to the memory 108 at a specified memory location during cycle 1, in which the processing core A has a priority P1. The processing core B with a higher priority P2 performs an exclusive read operation to the memory 108 at another specified memory location during cycle 2, and the processing core C with an even higher priority P3 performs an exclusive read operation to the memory 108 at another specified memory location during cycle 3. The exclusive read operations of the processing cores A, B, and C are acknowledged by the exclusive monitor 112 in cycles 3, 4, and 5, respectively. Again, the reduced shift table 114 is full since it holds the maximum of 3 entries as indicated beginning in cycle 4. As with FIGS. 7-9, although the memory locations are not specified, the exclusive operations are assumed to not conflict with each other from a memory standpoint.

Meanwhile in cycle 4, a processing core D having a lowest priority P0 performs an exclusive read operation while the shift table is full. As compared to the previously illustrated cases shown in FIGS. 7 and 8, the newest attempted reservation has a lower priority (P0) than any of the other entries current in the full shift table. In this case, the new reservation by the processing core D is rejected as indicated in cycle 5 (REJECT D P0) and as communicated back to the processing core D by the exclusive monitor 112 as "EXR FAIL D" in cycle 6. A normal operation begins in cycle 5 and completes in cycle 7 while the shift table remains full.

The processing cores A, B, and C perform exclusive write operations to clear their reservations in cycles 6, 7, and 8, respectively, which are acknowledged by the exclusive monitor 112 in cycles 8, 9, and 10, respectively. Meanwhile in cycle 9, the processing core D attempts to make another reservation (EXRD D P0). In this case the reduced shift table 114 is not full so that the reservation is made by the exclusive monitor 112 and acknowledged "EXR OK D" to core D in cycle 11.

FIG. 10 illustrates that a lower priority reservation attempt is rejected when the shift table is full of higher priority reservations. The lower priority processing core may attempt the reservation at a later time, which ultimately will be accepted so long as the shift table is either not full or has an older reservation with the same or even lower priority level.

A reservation in the shift table 114 may become "stale," meaning that the entity (e.g., core) that made the reservation by an exclusive load operation has not performed a subsequent exclusive store operation after a substantial number of cycles or iterations. If a reservation has a relatively low priority, it is less likely to become stale since it is more likely to be evicted when the shift table 114 is full and a new reservation with the same or higher priority is received, such as shown in FIG. 8. A reservation with a relatively high priority or the highest priority that is abandoned, however, may be "stuck" in the shift table 114 and become a stale entry. A higher priority reservation can become stale, for example, when the core that made the reservation enters an error mode or has to be reset or restarted or the like such that the reservation is effectively abandoned. One or more stale reservations in the shift table 114 reduces its effective size and reduces its relative efficiency.

There is a least one method to detect a stale reservation. When there are one or more stale reservations in the shift table 114, then the oldest stale reservation eventually becomes the oldest reservation located at the bottom of the shift table 114. The exclusive monitor 112 may be configured with a counter or timer or the like to detect when the oldest entry in the shift table 114 remains the same for a substantial amount of time or for a substantial number of cycles. A time threshold or count threshold may be used as a comparison to detect a stale reservation.

There are multiple methods to clear a stale reservation. In one embodiment, the exclusive monitor 112 sends a message or the like to the core (or other reserving entity) to clear the reservation. Or the exclusive monitor 112 interrupts the core, which executes a corresponding interrupt routine to identify and clear the stale reservation. There may, however, be messaging limitations and an interrupt can be too intrusive especially for high priority operations. In another embodiment, the exclusive monitor 112 invalidates the stale reservation and removes it from the table by shifting the other reservations down in the shift table 114. If the reserving entity or core attempts to clear the reservation, it is informed that the exclusive write fails such as shown in FIGS. 8 and 9. The core may attempt another reservation at that time or at a later time. In another embodiment, the exclusive monitor 112 changes the priority of the stale entry to the lowest priority. According to the eviction policy, the oldest reservation with the lowest priority is eventually evicted when the shift table 114 is full and a new reservation is received.

Figure 11:
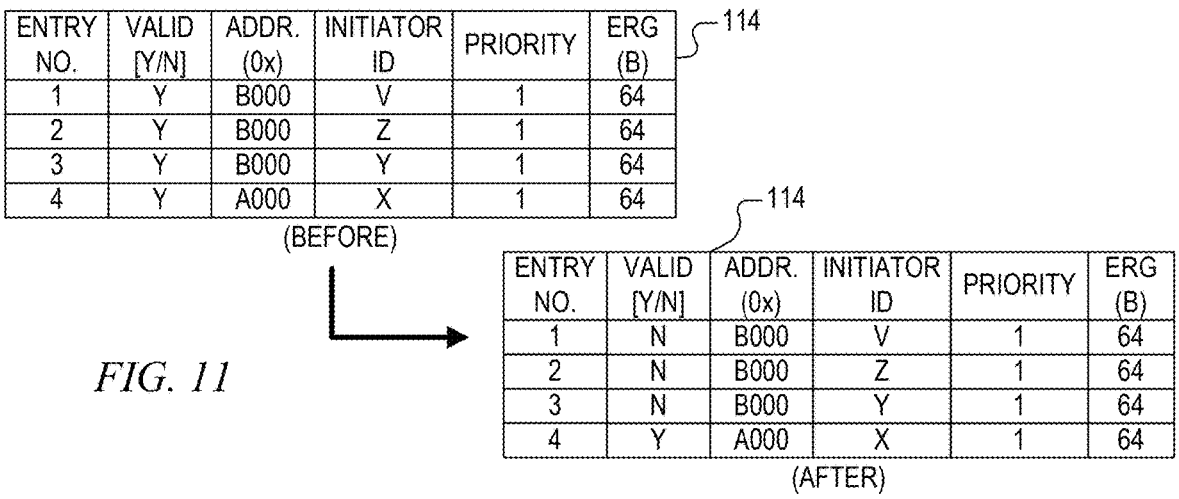
FIG. 11 shows BEFORE and AFTER states of simplified versions of the shift table illustrating the handling by the exclusive monitor of FIG. 1 of multiple conflicting reservations having the same priority level according to one embodiment.

FIG. 11 shows BEFORE and AFTER states of simplified versions of the shift table 114 illustrating the handling by the exclusive monitor 112 of multiple conflicting reservations having the same priority level according to one embodiment. Conflicting reservations occur when at the same address or have overlapping memory ranges (e.g., as shown by depictions 612 and 614 in FIG. 6). For simplicity of explanation, each reservation conflict is shown at the same address and having the same size of 64, the shift table 114 is depicted as having a maximum of 4 entries, the "position" column is excluded (where it is understood that the bottom or highest numbered entry is the oldest entry), and the "attributes" column is excluded as unnecessary for illustrating reservation conflict handling.

In the BEFORE state, an oldest reservation is held for core X at address 0xA000 with a priority of 1. Then, core Y makes a reservation at address 0xB000 with a priority of 1, followed by core Z which makes a reservation at the same address 0xB000 with the same priority of 1, and lastly followed by core V which makes a reservation at the same address 0xB000 with the same priority of 1. At this point, the shift table 114 holds each of the reservations by cores Y, Z, and V at the same address 0xB000 since having the same priority.

After the reservation by core V is made, the shift table 114 is full. Although not specifically shown, in one embodiment, an additional reservation at the same address 0xB000 with the same priority of 1 effectively replaces the oldest conflicting reservation. For example, a subsequent reservation by core W at the same address 0xB000 with the same priority of 1 causes the exclusive monitor 112 to evict the reservation held for Y at entry 3, to shift the reservations by cores Z and V down one position, and to enter the new reservation by core W into entry 1. In an alternative embodiment, additional reservations at the same address with the same priority level are rejected when the shift table 114 is full.

Although the reservations are technically conflicting reservations since at the same address, any one of the cores Y, Z, or V can complete the reservation by performing an exclusive store operation at the same address. Suppose, for example, that core Z is the first core to complete its reservation by performing an exclusive store operation at address 0xB000. When completed, the reservation by core Z and each of the conflicting reservations are cleared, or invalidated, such as shown in the AFTER state. A subsequent attempt by either of the cores Y or V to perform an exclusive store operation at address 0xB000 fails since each of the reservations has been invalidated. Either or both of these cores can attempt a subsequent reservation at the same address at a later time.

In an alternative embodiment, any new reservation request that conflicts with a valid entry in the shift table 114 at the same priority level is rejected by the exclusive monitor 112 even when the shift table 114 is not full. A benefit of this alternative embodiment is that the core is informed sooner of the conflict and can take remedial measures more quickly, such as by reserving a different address or by attempting the reservation at a later time.

Figure 12:
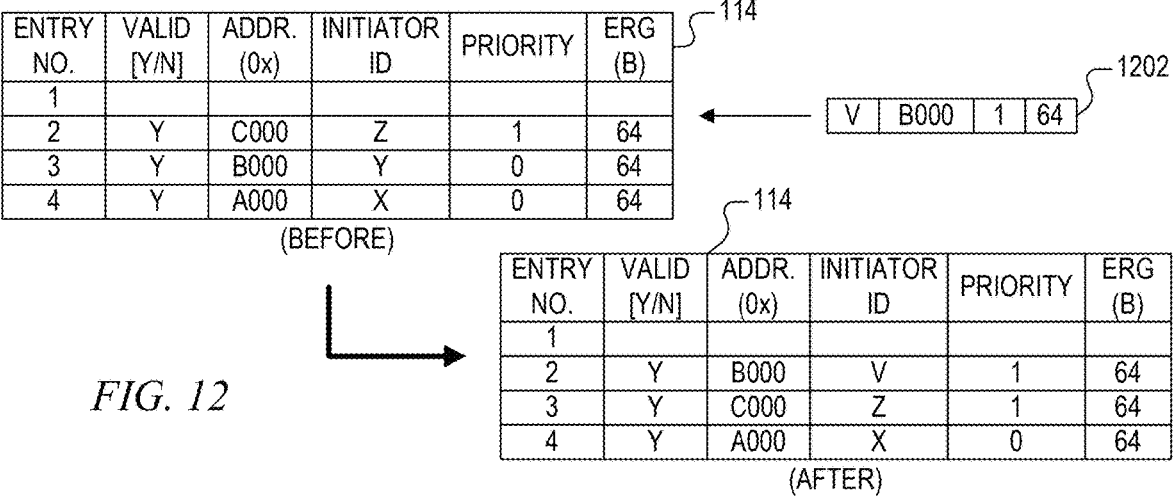
FIG. 12 shows BEFORE and AFTER states of simplified versions of the shift table illustrating the handling by the exclusive monitor of FIG. 1 of a new conflicting reservation that has a higher priority level than an existing reservation when the shift table is not full according to one embodiment.

FIG. 12 shows BEFORE and AFTER states of simplified versions of the shift table 114 illustrating the handling by the exclusive monitor 112 of a new conflicting reservation that has a higher priority level than an existing reservation when the shift table is not full according to one embodiment. In the same manner as shown in FIG. 11, each reservation conflict is shown at the same address and having the same size of 64, the shift table 114 is depicted as having a maximum of 4 entries, and the "position" and the "attributes" columns are excluded.

In the BEFORE state, core X has a valid reservation at address 0xA000 and size 64 with a priority of 0, core Y has a valid reservation at address 0xB000 and size 64 with a priority of 0, and core Z has a valid reservation at address 0xC000 and size 64 with a priority of 1. The shift table 114 is not full since entry 1 is an empty or otherwise invalid entry. Then core V makes a reservation request at address 0xB000 and size 64 with a priority of 1 as shown at 1202, which conflicts with the current reservation held for core Y. Since the shift table 114 is not full, the exclusive monitor 112 could enter this new reservation at entry 1, but this would cause the shift table 114 to store conflicting reservations with different priority levels. Instead, as shown in the AFTER state, entry 3 held by core Y is evicted in favor of the higher priority conflicting reservation by core V. After being evicted, the reservation held by core Z is shifted down to entry 3 and the new reservation by core V is entered at entry 2. Although the conflicting reservation previously held for core Y is effectively replaced, the new reservation by core V is placed at the top of the valid entries to maintain the ordering of reservations from oldest to newest.

Figure 13:
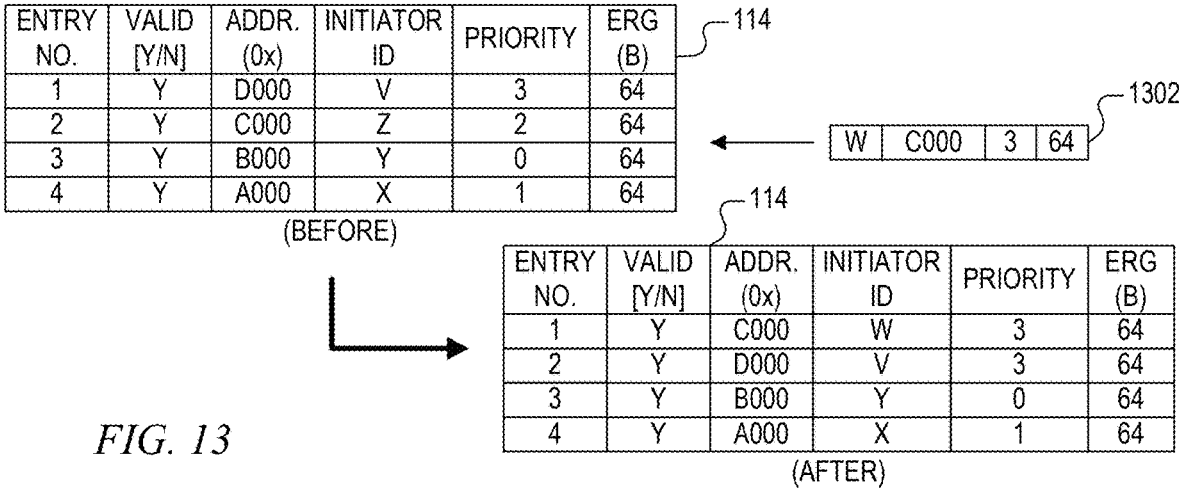
FIG. 13 shows BEFORE and AFTER states of simplified versions of the shift table illustrating the handling by the exclusive monitor of FIG. 1 of a new conflicting reservation that has a higher priority level than an existing reservation when the shift table is full according to one embodiment.

FIG. 13 shows BEFORE and AFTER states of simplified versions of the shift table 114 illustrating the handling by the exclusive monitor 112 of a new conflicting reservation that has a higher priority level than an existing reservation when the shift table is full according to one embodiment. In the same manner as shown in FIG. 11, each reservation conflict is shown at the same address and having the same size of 64, the shift table 114 is depicted as having a maximum of 4 entries, and the "position" and the "attributes" columns are excluded.

In the BEFORE state, core X has a valid reservation at address 0xA000 and size 64 with a priority of 1, core Y has a valid reservation at address 0xB000 and size 64 with a priority of 0, core Z has a valid reservation at address 0xC000 and size 64 with a priority of 2, and core V has a valid reservation at address 0xD000 and size 64 with a priority of 3, so that the shift table 114 is full. Then core W makes a reservation request at address 0xC000 and size 64 with a priority of 3 as shown at 1302, which conflicts with the current reservation held for core Z. Since the shift table 114 is full, the exclusive monitor 112 might normally evict the oldest reservation having the lowest priority, such as that held for core Y in entry 3. However, the new reservation conflicts with the currently held reservation for core Z in entry 2, which has a lower priority level 2 as compared to the higher priority level 3 of the new reservation request by W. Thus, as shown in the AFTER state, entry 2 held by core Z is evicted in favor of the higher priority conflicting reservation by core W. After being evicted, the reservation held by core V is shifted down to entry 2 and the new reservation by core W is entered at entry 1. Again, ordering of reservations from oldest to newest is maintained.

It is noted that a higher priority conflicting reservation request causes eviction of one or more of the existing conflicting reservations at a lower priority. For example, if core W makes a reservation request at address 0xB000 and size 64 with a priority of 3 when the shift table 114 is in the BEFORE state as shown in FIG. 11, then all three of the existing reservations held for cores Y, Z, and V at the same conflicting address 0xB000 are evicted and the new reservation is entered for core W.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims. For example, variations of positive circuitry or negative circuitry may be used in various embodiments in which the present invention is not limited to specific circuitry polarities, device types or voltage or error levels or the like. For example, circuitry states, such as circuitry low and circuitry high may be reversed depending upon whether the pin or signal is implemented in positive or negative circuitry or the like. In some cases, the circuitry state may be programmable in which the circuitry state may be reversed for a given circuitry function.

The terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A processing system, comprising:

a plurality of processing cores;

a memory that is shared by the plurality of processing cores;

a shift table configured to store up to a predetermined maximum number of reservations to addressed locations in the memory; and an exclusive monitor configured to use the shift table to enforce synchronization between the plurality of processing cores sharing the memory, wherein the exclusive monitor uses an eviction policy which evicts one or more valid reservations from the shift table based on a plurality of priority levels, an age of valid reservations, a fullness state of the shift table, and any reservation memory conflict when a new reservation is received, wherein, when the shift table is full such that every entry of the shift table stores a valid reservation when the new reservation is received, the eviction policy selects which valid reservation of the shift table to replace with the new reservation.

2. The processing system of claim 1, wherein each reservation of the shift table includes a memory address and a size value indicative of a flexible amount of reserved memory at the memory address.

3. The processing system of claim 2, wherein the size value comprises a plurality of size values up to a predetermined maximum memory size.

4. The processing system of claim 2, wherein the size value comprises a number of bytes up to a predetermined maximum number of bytes.

5. The processing system of claim 1, wherein the exclusive monitor is configured to evict an oldest valid reservation in the shift table having a same or lower priority level as a priority level of the new reservation, wherein the oldest valid reservation is evicted by being replaced with the new reservation.

6. The processing system of claim 1, wherein the exclusive monitor is configured to reject the new reservation when the new reservation has a lower priority level than each valid reservation in the shift table when the shift table is full.

7. The processing system of claim 1, wherein the exclusive monitor is configured to shift reservations in the shift table that are newer than an invalidated reservation by one entry to replace the invalidated reservation.

8. The processing system of claim 1, wherein the exclusive monitor is configured to detect and invalidate a stale reservation in the shift table.

9. The processing system of claim 1, wherein the exclusive monitor is configured to detect and change a priority of the stale reservation to a lowest priority level.

10. The processing system of claim 1, wherein the exclusive monitor is configured to enter multiple reservations at conflicting memory addresses in the shift table when at the same priority level, and to evict any lower priority reservations in the shift table that have a memory conflict with the new reservation having a higher priority level.

11. The processing system of claim 1, wherein, when the shift table is not full and a second new reservation is received which includes a reservation memory conflict with an existing valid entry of the shift table but has a lower priority than the second new reservation, the eviction policy evicts the existing valid entry by invalidating the existing valid entry, and enters the second new reservation into an empty entry.

12. A method of enforcing synchronization between a plurality of processing cores sharing a memory in a processing system, the method comprising:

providing a shift table that is configured to store up to a predetermined maximum number of reservations to addressed locations in the memory; and applying a reservation eviction policy which evicts one or more valid reservations from the shift table based on a plurality of priority levels, an age of valid reservations, a fullness state of the shift table, and any reservation memory conflict when a new reservation is received, wherein applying the reservation eviction policy comprises:

when the shift table is full such that every entry of the shift table stores a valid reservation when the new reservation is received, applying the eviction policy to select which valid reservation of the shift table to evict in favor of the new reservation; and replacing the valid reservation selected for eviction with the new reservation.

13. The method of claim 12, wherein the providing a shift table comprises providing a shift table including a memory address and a size value indicative of a flexible amount of reserved memory at the memory address.

14. The method of claim 13, wherein the size value comprises a plurality of size values up to a predetermined maximum memory size.

15. The method of claim 13, wherein the size value comprises a number of bytes up to a predetermined maximum number of bytes.

16. The method of claim 12, further comprising evicting an oldest valid reservation in the shift table having a same or lower priority level as a priority level of the new reservation, wherein the oldest valid reservation is evicted by being replaced with the new reservation.

17. The method of claim 12, further comprising rejecting the new reservation when the new reservation has a lower priority level than each valid reservation in the shift table when the shift table is full.

18. The method of claim 12, further comprising shifting reservations in the shift table that are newer than an invalidated reservation by one entry to replace the invalidated reservation.

19. The method of claim 12, further comprising detecting and invalidating a stale reservation in the shift table.

20. The method of claim 12, further comprising detecting and changing a priority of the stale reservation to a lowest priority level.

21. The method of claim 12, further comprising entering multiple reservations at conflicting memory addresses in the shift table when at the same priority level, and evicting any lower priority reservations in the shift table that have a memory conflict with the new reservation having a higher priority level.

* * * * *